US007190807B2

(12) United States Patent
Tamaru et al.

(10) Patent No.: US 7,190,807 B2
(45) Date of Patent: Mar. 13, 2007

(54) DIGITAL WATERMARK EXTRACTING METHOD, APPARATUS, PROGRAM AND STORAGE MEDIUM

(75) Inventors: Jun Tamaru, Tokyo (JP); Keiichi Iwamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 810 days.

(21) Appl. No.: 10/385,852

(22) Filed: Mar. 12, 2003

(65) Prior Publication Data
US 2004/0022411 A1 Feb. 5, 2004

(30) Foreign Application Priority Data
Mar. 14, 2002 (JP) ............................ 2002-069624
Feb. 24, 2003 (JP) ............................ 2003-045827

(51) Int. Cl.
*G06K 9/00* (2006.01)
(52) U.S. Cl. ..................................................... 382/100
(58) Field of Classification Search ................. 382/100
See application file for complete search history.

(56) References Cited

U.S. PATENT DOCUMENTS

| 5,003,616 | A | * | 3/1991 | Orita et al. ................. 382/282 |
| 5,600,720 | A | | 2/1997 | Iwamura et al. ................. 380/1 |
| 5,666,419 | A | | 9/1997 | Yamamoto et al. ........... 380/28 |
| 5,861,619 | A | | 1/1999 | Horino et al. ............... 235/470 |
| 5,937,395 | A | | 8/1999 | Iwamura ...................... 705/30 |
| 6,086,706 | A | | 7/2000 | Brassil et al. ................ 156/277 |
| 6,088,454 | A | | 7/2000 | Nagashima et al. .......... 380/49 |
| 6,119,937 | A | * | 9/2000 | Wang et al. ................. 235/454 |
| 6,246,775 | B1 | * | 6/2001 | Nakamura et al. .......... 382/100 |
| 6,425,081 | B1 | | 7/2002 | Iwamura ...................... 713/176 |
| 6,535,616 | B1 | | 3/2003 | Hayashi ...................... 382/100 |
| 6,611,607 | B1 | * | 8/2003 | Davis et al. ................ 382/100 |

(Continued)

FOREIGN PATENT DOCUMENTS

JP 8-223409 8/1996

(Continued)

OTHER PUBLICATIONS

"Electronic Document Data Hiding Technique Using Inter-Character Space," Chotikakamthorn, 1998 IEEE Asia-Pacific Conf r. on Circuits and Systems, 1998, pp. 419-422.

*Primary Examiner*—Bhavesh M Mehta
*Assistant Examiner*—Damon M Conover
(74) *Attorney, Agent, or Firm*—Fitzpatrick, Cella, Harper & Scinto

(57) ABSTRACT

The invention is to precisely extract a digital watermark from image data which are subjected to embedding of the digital watermark in a state of a binary image and are then converted into a multi-value image (gray scale image).

For attaining the foregoing object, a digital watermark extracting apparatus for extracting a digital watermark for example in an original includes an acquiring unit for acquiring multi-value image data obtained by reading the original with a predetermined reading unit, a pre-processing unit for selecting one of plural threshold values and binarizing the multi-value image data with the selected threshold value, and an extracting unit for extracting the digital watermark from image data binarized in the pre-processing unit, wherein selection of the threshold value, binarization an extraction of the digital watermark are repeated to obtain an optimum extraction result of the digital watermark.

9 Claims, 8 Drawing Sheets

U.S. PATENT DOCUMENTS

| | | |
|---|---|---|
| 6,898,297 B2 * | 5/2005 | Katsura et al. .............. 382/100 |
| 2001/0012019 A1 | 8/2001 | Yamazaki et al. ........... 345/639 |
| 2001/0017709 A1 | 8/2001 | Murakami et al. ......... 358/1.14 |
| 2001/0017717 A1 | 8/2001 | Ishida et al. ................. 358/464 |
| 2001/0055390 A1 | 12/2001 | Hayashi et al. ............. 380/220 |
| 2002/0002679 A1 | 1/2002 | Murakami et al. ........... 713/176 |
| 2002/0060736 A1 | 5/2002 | Wakao et al. ............... 348/207 |
| 2002/0104003 A1 | 8/2002 | Iwamura ...................... 713/176 |
| 2002/0133705 A1 | 9/2002 | Tagashira et al. ........... 713/176 |
| 2002/0165823 A1 | 11/2002 | Iwamura ....................... 705/41 |
| 2003/0012406 A1 | 1/2003 | Iwamura ...................... 382/100 |

FOREIGN PATENT DOCUMENTS

JP      11-234502      8/1999

* cited by examiner

DIGITAL WATERMARK EXTRACTING METHOD, APPARATUS, PROGRAM AND STORAGE MEDIUM

BACKGROUND OF THE INVENTION

1. Field of the Invention

The present invention relates to a digital watermark extracting method for appropriately extracting a digital watermark embedded in a document original or the like, an extracting apparatus, a program for executing such method, and a storage medium storing such program.

2. Related Background Art

Digital watermarking is attracting attention for copyright protection in circulating digitized data of image or sound on the Internet. The digital watermarking is a technology of processing digitized data of image or sound thereby embedding information in indiscernible manner to human. In the digital watermarking of a multi-value image, there are known various methods utilizing redundancy in pixel density.

On the other hand, so-called binary image such as a document original has little redundancy and the digital watermarking technology is difficult to apply.

However some methods for embedding digital watermark utilizing features specific to the document original are already known. For example, there are known a method of moving a base line of a row (U.S. Pat. No. 6,086,706), a method of manipulating a blank length between words (U.S. Pat. No. 5,861,619), a method of manipulating a blank length between letters ("Electronic document data hiding technique using inter-character space," King Mongkut University, 1998 IEEE Asia-Pacific Conf. on Circuits and Systems, 1998, pp.419–422) and a method of handing as a black-and-white binary map (Japanese Patent Application Laid-open No. 11-234502).

In case a digital watermark is embedded in so-called binary image by the aforementioned digital watermark embedding method, then the image is printed, for example, by a printer and read by a scanner thereby being changed into a gray scale image, it is difficult to correctly extract the digital watermark from such gray scale image. The binarization of an image is usually conducted with a single fixed threshold value, but, for correct extraction of the digital watermark, another threshold value may be more appropriate.

SUMMARY OF THE INVENTION

The present invention has been made in consideration of the foregoing drawback and is to enable precise extraction of the digital watermark from image data, which have been subjected in a state of binary data to an embedding of a digital watermark, and are then changed to multi-value image (gray scale image).

More specifically, an object of the present invention is, in case the digital watermark is embedded by changing a distance between character images representing the binary image, to precisely extract such digital watermark from a multi-value image in which such digital watermark is embedded.

The above-mentioned-object can be attained, according to the present invention, by a digital watermark extracting method including:

an acquisition step of acquiring multi-value image data which represent an image which has been subjected in a state of binary image to embedding of a digital watermark and are obtained by a conversion into a multi-value state after such embedding;

a pre-processing step of selecting one of plural threshold values for binarization and binarizing the multi-value image data with the selected threshold value;

an extracting step of extracting the digital watermark from binary image data binarized in the pre-processing step; and an output step of repeating a binarization by selecting an unselected one from the plural threshold values and an analysis of binary image data obtained by such binarization, then specifying a result of analysis meeting a predetermined standard from the plural results of the analyses obtained from the repetition, also specifying a final digital watermark based on digital watermark extracted from the binary image data binarized with threshold value corresponding to the specified result of analysis, and outputting such digital watermark.

Other objects of the present invention, and the features thereof, will become fully apparent from following description of embodiments, to be taken in conjunction with the accompanying drawings.

DESCRIPTION OF THE PREFERRED EMBODIMENTS

In the following, preferred embodiments of the present invention will be explained in succession, with reference to the accompanying drawings.

Figure 9:
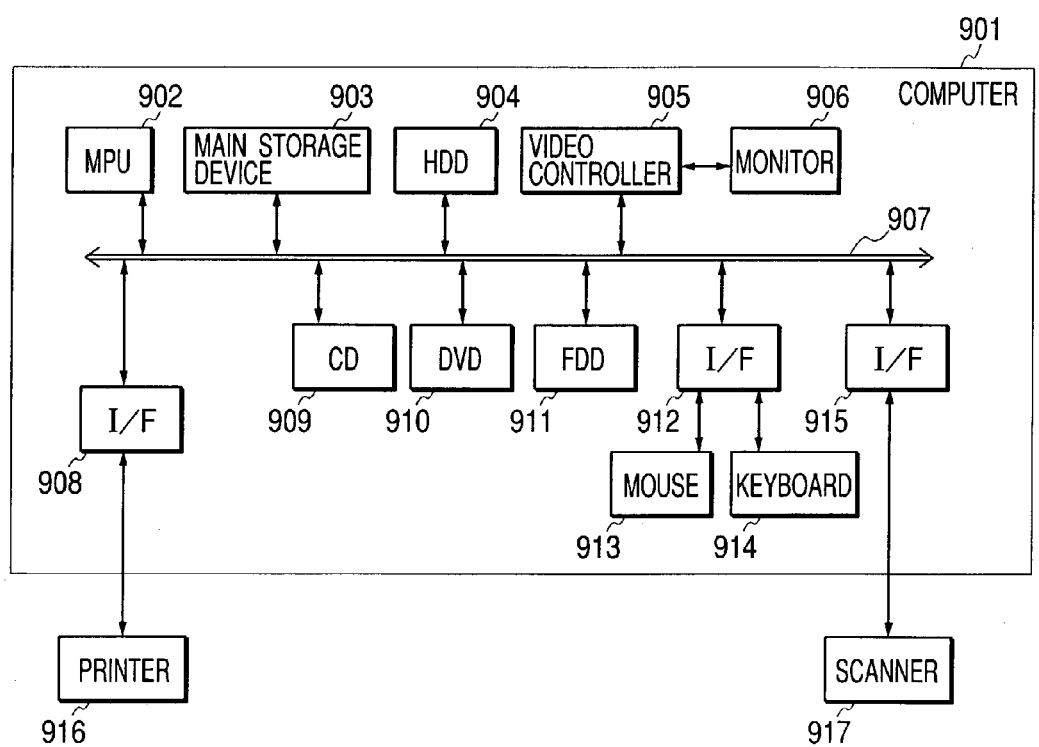
FIG. 9 is a block diagram of a general image processing apparatus applicable to the embodiments.

At first, reference is made to FIG. 9 for explaining an image processing apparatus applicable to the embodiments.

In each embodiment, it is not essential to employ all the functions shown in FIG. 9, but there may be employed a necessary part only.

Referring to FIG. 9, a computer 901 is constituted by an ordinary personal computer, and is capable of entering a read image from an image input apparatus 917 such as a scanner and executing editing and storage of such image. Also, the image obtained by the image input apparatus 917 can be printed by the printer 916. Also various instructions from a user are entered by an operation on a mouse 913 or a keyboard 914.

In the computer 901, a bus 907 connects various units (blocks) to be explained later, thereby enabling exchange of various data. An MPU 902 controls the function of the blocks in the computer 901, and can execute an internally stored program. A main storage apparatus 903 temporarily stores a program and image data to be processed, for a process to be executed by the MPU 902. A hard disk (HDD) 904 is capable of storing in advance the program and the image data to be transferred to the main storage apparatus 903 or image data after processing.

A scanner interface (I/F) 915 is connected to a scanner 917 for generating image data by reading an original or a film, and is capable of entering image data obtained by the scanner 917. A printer interface 908 is connected to a printer 916 for printing image data, and is capable of transmitting image data to be printed to the printer 916.

A CD drive 909 is capable of reading data from or writing data into a CD (CD-R/CD-RW) which is one of external storage media. An FDD drive 911 is a device capable, like the CD drive 909, of reading data from or writing data into the FDD. A DVD drive 910 is a device capable, like the CD drive 909, of reading data from or writing data into the DVD. When an image editing program or a printer driver is stored in CD, FDD or DVD, such program is installed on the HDD 904 and is transferred to the main storage apparatus 903 if necessary.

An interface (I/F) 912 is connected to the mouse 913 and the keyboard 914 for accepting an input instruction therefrom. A monitor 906 is a display apparatus capable of displaying result or process state of watermark information extracting process. Also a video controller 905 serves to transmit display data to the monitor 906.

(First Embodiment)

The digital watermark extracting apparatus in the present embodiment is capable of being provided with plural kinds of pre-processing to be executed prior to the digital watermark extraction, and can have plural related parameters for each pre-processing. A change in the parameter changes the result of each pre-processing (content of image after the pre-processing).

The apparatus can also repeat the pre-processing and the digital watermark extraction by the number same as that of such values (the number of types of pre-processings the number of related parameters).

From the obtained extraction results of plural times, a result meeting a certain standard is specified as an optimum result and is outputted as a final extraction result of the digital watermark.

However, such specifying may be made by specifying the optimum result from all the extraction results obtained after repeating the extractions of the maximum possible number or by specifying the optimum result from plural extraction results obtained from extractions of a number less than the aforementioned maximum possible number.

In the following there are shown the pre-processing prior to the digital watermark extraction in the present embodiment and parameters relating to the result of such pre-processing:

i) binarizing of a gray scale image with a simple threshold value (related parameter: threshold value);

ii) binarizing by adaptively determining the threshold value with reference to the density distribution of a gray scale image (related parameter: value representing a deviation of the frequency distribution (for example corresponding to a skew statistical amount Sk in Japanese Patent Application Laid-open No. 08-223409));

iii) a combination of either binarization i or ii and at least one of following processes a-c:

a: a process of attaching a black pixel so as to be in contact with a boundary of a white pixel and a black pixel (related parameter: number of added black pixels);

b: a process of attaching a white pixel so as to be in contact with a boundary of a white pixel and a black pixel (related parameter: number of added white pixels);

c: elimination of an isolated point considered as a noise (related parameter: upper limit of magnitude of isolated point to be eliminated).

It is possible to improve precision of the digital watermark extraction to be explained later by preparing the aforementioned related parameter in plural number and selectively utilizing such plural parameters. Also the precision of extraction can be improved further by preparing the pre-processing in plural kinds.

The pre-processing is not limited to those described in the foregoing, but there may be employed any known process and parameters thereof as long as it is a process for converting a gray scale image into a binary image or a process of executing an image adjustment before or after such conversion.

In the following there will be explained, as representative examples, a case of binarizing pre-processing with a simple threshold value explained in the foregoing i) and a case in which the parameter relating to the pre-processing selectively utilizes the binarizing threshold values. Other pre-processing methods and method of changing parameter are similar and will not therefore be explained. Also in case of executing the pre-processing in plural kinds, the parameters corresponding to these kinds (combination of parameters) can be changed in various orders, but such orders will not be explained.

Figure 1:
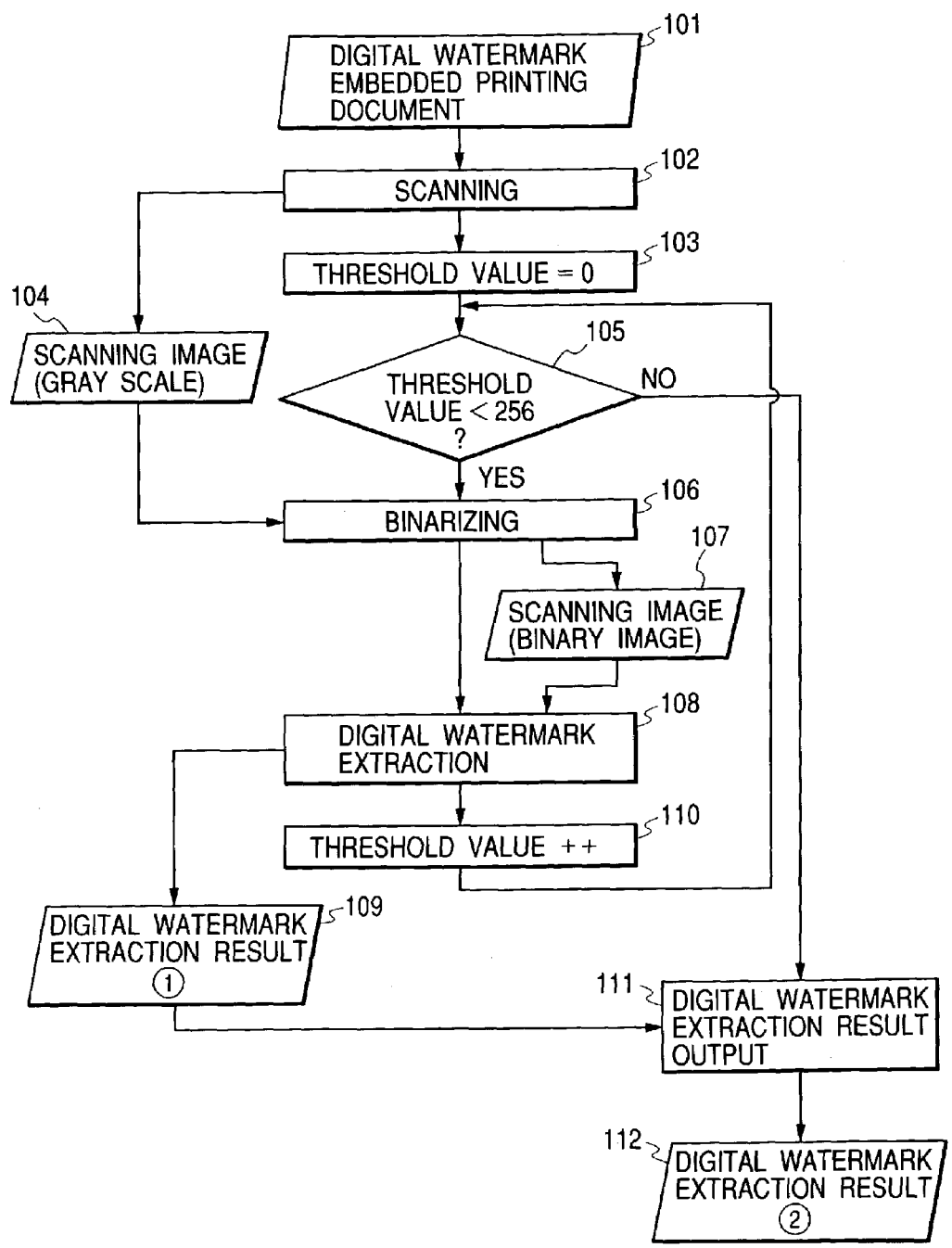
FIG. 1 is a flow chart showing a digital watermark extracting process (entire process) constituting a first embodiment.

FIG. 1 is a view showing a series of process steps to the digital watermark extraction in this embodiment.

Following process steps are all executed under the control of the MPU 902 shown in FIG. 9.

In FIG. 1, a numeral 101 indicates a binary image (document original) which is subjected to embedding of digital watermark and is printed by a method to be explained later. It is explained as a binary image, but it need not be a complete binary image if it is printed as an equivalent image.

A step 102 reads the image with a predetermined scanner (corresponding to the scanner 917 shown in FIG. 9).

A step 103 provides an initial binarizing threshold value 0. Such parameters for pre-processing are stored in the main storage apparatus 903 in FIG. 9.

A numeral 104 is a multi-value image (gray scale image) read by the aforementioned predetermined scanner. This image is also stored in the main storage apparatus 903 shown in FIG. 9.

A step 105 discriminates whether the threshold value is 255.

A step 106 executes binarization with the threshold value compared in the step 105.

A numeral 107 is so-called binary image obtained by binarizing the gray scale image. This image is stored also in the main storage apparatus 903 in FIG. 9.

A step 108 extracts, by a digital watermark extracting method to be explained later, the digital watermark embedded by a digital watermark embedding method to be explained later.

A numeral 109 is a digital watermark (extraction result) extracted in the step 108. This digital watermark is subjected a parity check in a later step 111, and only a result that is judged as a correct digital watermark without error is stored as a correct extraction result (1). Such result (1) is also stored in the main storage apparatus 903 in FIG. 9.

A step 110 adds +1 to the binarizing threshold value.

A step 111 executes a parity check on the extraction result (1) of the digital watermark, then stores only the result judged as correct digital watermark without error as a correct extraction result (1), and executes a majority judgment solely on the extraction results estimated as correct thereby outputting a final extraction result of the digital watermark.

A numeral 112 shows a final extraction result of the digital watermark obtained in the step 111.

In the following, the process flow will be explained in succession with reference to FIG. 1.

At first, in a step 102, the aforementioned binary image 101 is read by the predetermined scanner to output the multi-value image (gray scale image) 104. The gray scale image 104 is assumed to have 8 bits per pixel. In the present embodiment, the process is assumed to start from reading a printed image, but there is also included a case where the image is not printed, for example a case of acquiring a multi-value image (gray scale image) which is subjected to embedding of digital watermark in a state of a binary image and is then converted into a multi-value state.

Then a step 103 sets the binarizing threshold value at 0.

Then a step 104 discriminates whether the threshold value is less than 256 (namely equal to or less than 255).

In case the threshold value is equal to or less 255, the sequence proceeds to a step 106 to binarize the gray scale image 104 with such threshold value. This binarization generates a binary image 107.

A step 108 extracts a digital watermark (extraction result) (1) 109 from the binary image 107.

In the present embodiment, the binarizing process in the step 106 and the digital watermark extracting process in the step 108 are repeated by changing the binarizing threshold value by 1 each time from 0 to 255. Therefore, after the process of the step 108, the sequence proceeds to a step 110 to add +1 to the binarizing threshold value used in the step 106, and the sequence returns to the step 105.

In case the step 105 discriminates that the threshold value becomes larger than 255 (threshold value >255), there is identified that "the binarizing process and the digital watermark extracting process have been completed for all the threshold values 0 to 255" and the sequence proceeds to a step 111.

A step 111 executes a parity check on each of the results obtained by the binarizations of plural times and the digital watermark extracting processes of plural time through the aforementioned steps (plural digital watermark extraction results (1)) and accumulates only the results (digital watermarks) identified as correct digital watermarks without error. Therefore, the step 111 may be executed in parallel in time to the aforementioned steps.

In the following description, it is assumed that plural digital watermarks are accumulated.

Also the step 111 executes a majority decision, for the accumulated plural results (1) 109 of digital watermark extraction, on each bit digit of such digital watermark extraction results (plural bit trains).

For example the accumulated digital watermark extraction result (1) 109 is present in following three units:

(01001 . . . 1),
(01111 . . . 0),
(00101 . . . 1), a majority decision is made on each digit thereby judging (01101 . . . 1) as a final extraction result (2) 112 of the digital watermark extraction, and such result (2) is outputted.

The embedding and extraction of the digital watermark can be achieved, for example, by a method to be explained later. However, in case the digital watermark has to be extracted after conversion of a multi-value image into a binary image, the embedding and extraction of the digital watermark may be made in various known methods.

<Embedding Method for Digital Watermark>

Figure 2:
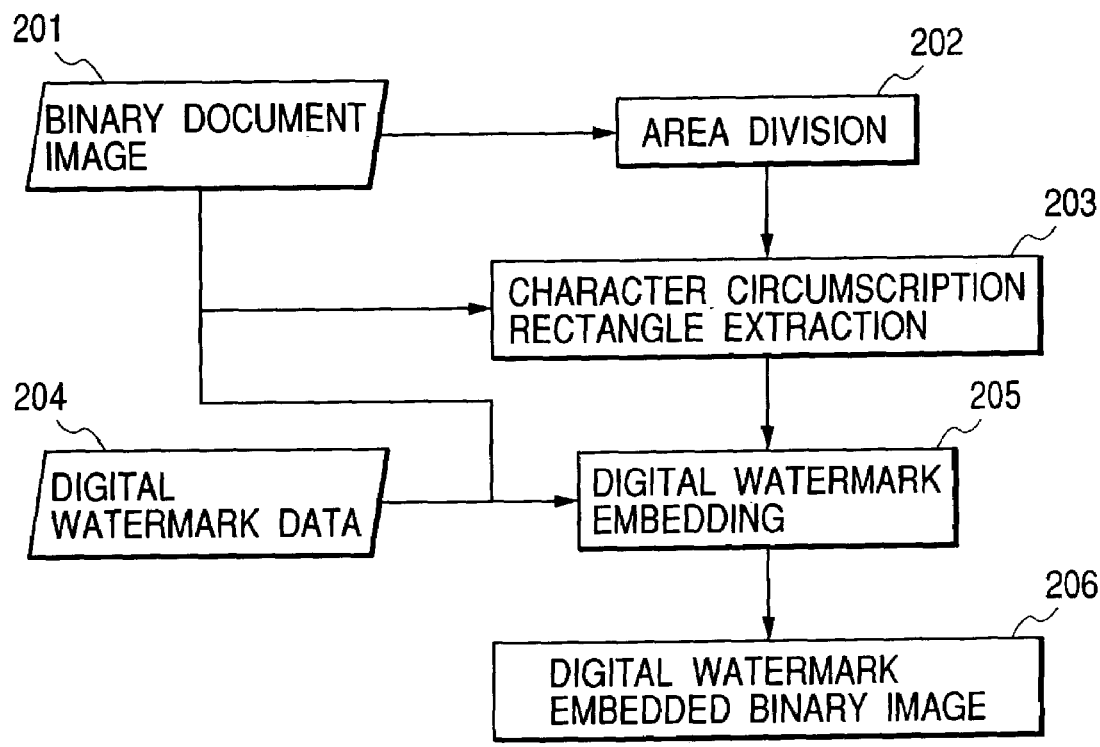
FIG. 2 is a flow chart showing a digital watermark embedding process of the first embodiment.

FIG. 2 shows a method for embedding a digital watermark.

At first a step 202 divides a binary document image 201 by a known document image analyzing technology into plural partial areas according to the type of image, such as image, text or graph.

In the present embodiment, there will be explained embedding of a digital watermark in an area, among the above-mentioned image types, corresponding to a text which is known as a representative image of the binary image. However, the present invention is applicable widely to digital watermark embedding in a binary image.

Then a step 203 executes, in an area identified as a text image, detection of a rectangle (contour) circumscribing each character. The method of such contour detection is already known for example in "Shin-ichiro Hashimoto, Review on character recognition, published by Electronic Communication Association, 1982," and will not therefore be explained further.

In the present embodiment, digital watermark data (plural bit trains) 204 shown in FIG. 2 are embedded in the aforementioned text area, by adjusting a space between the characters (rectangles circumscribing characters).

The above-mentioned digital watermark data 204 are subjected in advance to a parity encoding, in order to enable a parity check at the aforementioned digital watermark extraction. Digital watermark information (bit train) entered by the user for embedding is data prior to the parity encoding of the digital watermark data 204.

The a step 205 embeds the digital watermark data 204 in the aforementioned text area according to an embedding rule to be explained later.

The text area (binary image) thus obtained is printed, together with other areas (image, graph), on a recording medium such as paper.

<Embedding Rule>

In the following, details of the aforementioned embedding rule will be explained with reference to FIG. 4.

Figure 4:
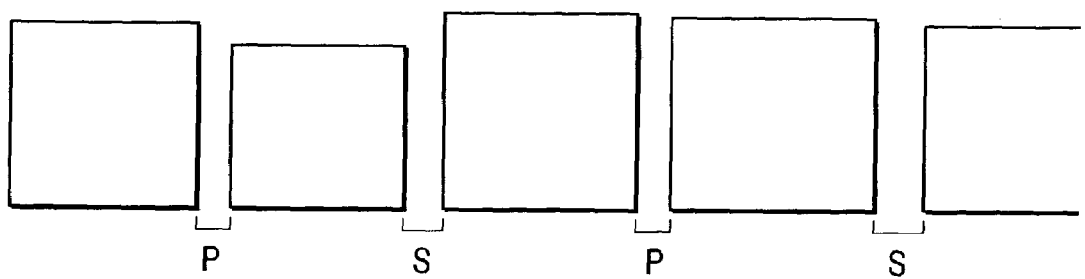
FIG. 4 is a view showing circumscription rectangles of characters and lengths of spaces therebetween.

A rectangle in FIG. 4 is a circumscription rectangle of each character in the aforementioned text area. It is assumed that each rectangle contains a character.

A length of a space between the circumscription rectangle is set as P or S. P and S are assigned alternately, and more specifically in an order from the left end:

P0, S0, P1, S1, . . . , Pi, Si, . . . , Pk, Sk.

More specifically it is assumed that the space lengths prior to the embedding of the digital watermark are:

P0, S0, P11, S1, . . . , Pi, Si, . . . , Pk, Sk;

and that the space lengths after the embedding of the digital watermark are:

P0', S0', Pi', S', . . . , Pi', Si', . . . , Pk', Sk'.

Figure 5:
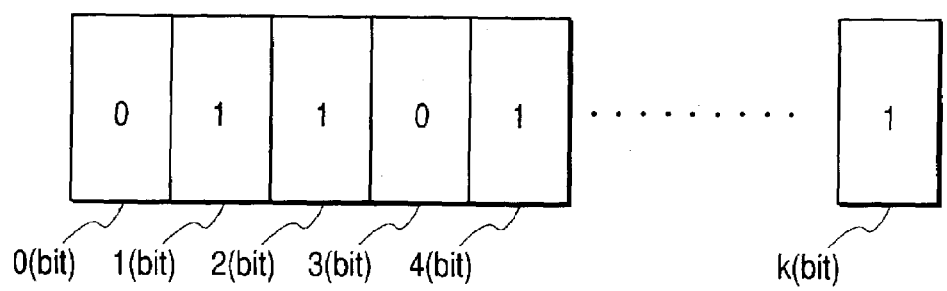
FIG. 5 is a view showing a bit train of digital watermark data.

It is also assumed that the digital watermark data are a bit train as shown in FIG. 5, for example: (01101 . . . 1).

In the present embodiment, the embedding of the digital watermark is achieved, according to the bit value (1 or 0) of an i-th bit (0<i<k), by changing the space length Pi and Si to Pi' and Si'.

More specifically, in case the i-th bit (0<i<k) is 0 in the digital watermark data 204, Pi and Si are changed to following Pi' and Si':

$$Pi'=(1-\rho)*(Pi+Si)/2$$

$$Si'=(1+\rho)*(Pi+Si)/2$$

Stated differently, a character positioned between spaces Pi and Si is shifted to a position between Pi' and Si'.

In case the i-th bit (0<i<k) is 1 in the digital watermark data 204, Pi and Si are changed inversely to following Pi' and Si':

$$Pi'=(1-\rho)*(Pi+Si)/2$$

$$Si'=(1-\rho)*(Pi+Si)/2$$

In the above-described method, the i-th bit of the digital watermark data 204 is represented by the space lengths Pi and Si, and the embedded bit (1 or 0) can be identified from the magnitude (long-short) relationship of the space lengths Pi and Si.

In the present embodiment, a case Pi>Si represents 1 while a case Pi<Si represents 0.

The aforementioned parameter $\rho$ is a constant, and so-called embedding intensity in the digital watermark embedding. A larger value of $\rho$ increases the difference in the relationship Pi>Si or Pi<Si after embedding a bit 1 or 0.

A larger value of the parameter $\rho$, corresponding to a stronger embedding of the digital watermark, provides an advantage of increasing the probability of extracting the embedded digital watermark data even in the presence of certain attack (intentional or unintentional changes in the character space) to the character image after embedding, but may cause an unnatural appearance in the character space.

On the other hand, a smaller value of the parameter $\rho$, corresponding to a weaker embedding of the digital watermark, provides an advantage of reducing the unnatural appearance in the character space but the embedded information may become unextractable even by a slight attack after the embedding.

In the following, there will be explained a method for extracting the digital watermark.

<Extracting Method for Digital Watermark>

Figure 3:
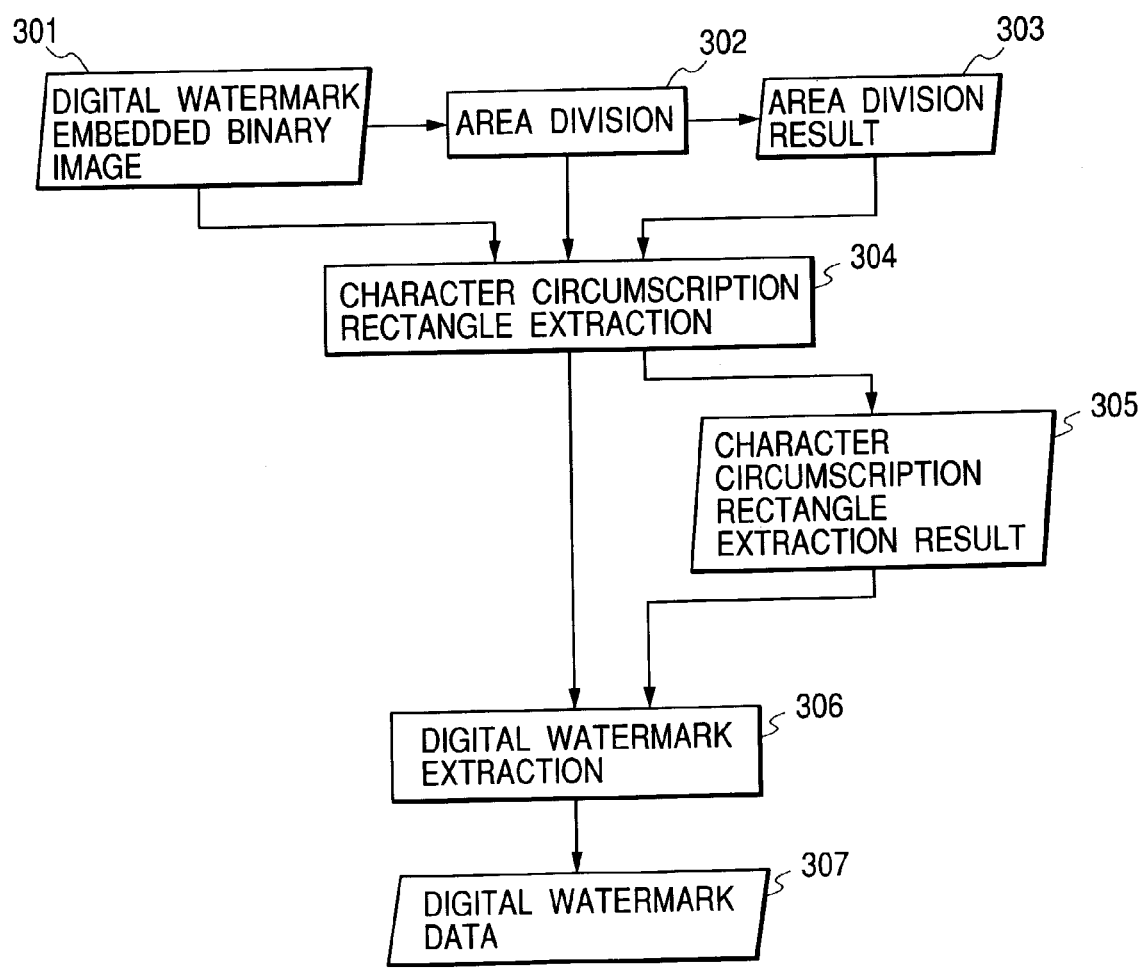
FIG. 3 is a flow chart showing a digital watermark extracting process (details) constituting the first embodiment.

FIG. 3 shows a digital watermark extracting method. It is an extracting method corresponding to the digital watermark embedding explained in FIG. 2, and constitutes an example of the extracting method of the step 108 shown in FIG. 1.

A binary image 301 in FIG. 3 is a binary image after the binarizing process shown in FIG. 1. More specifically, an image including the binary image 206 shown in FIG. 2 as a text area is printed, then read by a scanner to provide a multi-value image, which is then binarized in the step 106 in FIG. 1 to provide the binary image 301 shown in FIG. 3.

A step 302 divides the binary document image 301 by a known document image analyzing technology into plural partial areas according to the type of image, such as image, text or graph. The step 302 is basically similar to the step 202 in FIG. 2. The step 302 retains positional information of an area corresponding to text as a result 303 of area division.

In the present embodiment, the digital watermark extraction is executed from an area corresponding to the text among the aforementioned types of the image, because the embedding side executes the area division in a similar manner and embeds the digital watermark only in such area corresponding to the text.

Then a step 304 refers to a result 303 of area division and executes, only in the test area of the binary image 301, detection/extraction of a circumscription rectangle (contour) of each character contained in such area. The step 304 is similar to the step 203 in FIG. 2. The step 304 retains the positions of the circumscription rectangles (corresponding to the circumscription rectangles in FIG. 4) and the space lengths between the rectangles as an extraction result 305. These space lengths should coincide with the aforementioned P0', S0', P1', S1', . . . , Pi', Si', . . . , Pk', Sk' unless an intentional editing by a third person on the printed document 101 (binary image 301).

Then a step 306 compares, using the aforementioned embedding rule on the sequence P0', S0', P1', S1', . . . , Pi', Si', . . . , Pk', Sk', the magnitude relationship of each Pi and Si, thereby extracting the i-th bit of the digital watermark data 204. Thus there are outputted digital watermark data 307 (digital watermark extraction result (1) 109) constituting a candidate of the digital watermark data 204.

The digital watermark data 307 (digital watermark extraction result (1) 109) are parity encoded as in the digital watermark data 204, and are later subjected to a parity check in the step 111. If judged as incorrect digital watermark data, they are not accumulated but are discarded.

The apparatus explained in the foregoing embodiment is provided with an acquisition unit (corresponding to scanner 901; and step 102 etc.) for acquiring multi-value image data representing an image in which the digital watermark is embedded in a state of a binary image and obtained by conversion into a multi-value state after such embedding, a pre-processing unit (corresponding to MPU 902; and steps 103, 105, 106, 110 etc.) for selecting one of plural binarizing threshold values and binarizing the multi-value image data with the selected threshold value, and an extracting unit (corresponding to MPU 902; step 108 etc.) for extracting the digital watermark from binary image data, obtained by binarization in the pre-processing unit, also is adapted to repeat plural times execution of binarization by selecting an unselected one from the plural threshold values and analysis of binary image data obtained by such binarization (corresponding to extraction of the digital watermark using threshold values 0–255 in succession), then to specify, from the plural analysis results obtained by such repetition (corresponding to the extraction result (1) prior to parity check), an analysis result satisfying a predetermined standard (corresponding to the extraction result (1) after parity check), and, based on digital watermarks extracted from the binary image data binarized with the threshold value corresponding to the specified analysis result (corresponding to the plural extraction results (1) after parity check), to specify a final digital watermark (corresponding to the digital watermark specified by majority decision of the plural extraction results (1) after parity check), and is further provided with output means (corresponding to MPU 902; step 111) for outputting such digital watermark.

As explained in the foregoing, the present embodiment enables, in extracting digital watermark from a binary image represented by a character image in which the digital watermark is embedded, even in case such binary image is once printed and then converted into a multi-value image by reading with a scanner, to achieve digital watermark extraction based on an image obtained by a suitable binarization from such multi-value image.

At the digital watermark extracting side, it is difficult to judge the optimum binarization, but the final result of the digital watermark is judged by a majority decision only among the results having a certain reliability (those passing the parity check) whereby a correct result can be outputted with a high probability.

(Second Embodiment)

In the foregoing embodiment, the digital watermark extraction is executed for all the pre-processing candidate parameters (for example binarizing threshold values), and all the extracted results for the digital watermark are subjected to a parity check or a majority decision to provide a highly reliable extraction result for the digital watermark, but the present invention is not limited to such embodiment.

In the foregoing embodiment, the digital watermark extracting process has to be executed for all the pre-processing parameters. Such process is very difficult to realize for example with a software process.

In the present embodiment, therefore, in contrast to the foregoing first embodiment, the digital watermark extraction is not executed for all the parameters.

More specifically, after an appropriate initial value is set for each of the parameters relating to the pre-processing (for example binarizing threshold value), the pre-processing and the extraction of the digital watermark are repeated with a change in each parameter as in the foregoing first embodiment, but the process is terminated when the extraction result of the digital watermark satisfies a certain standard.

This process is effective in reducing the process time in case the pre-processing (combination of parameters) exists in plural types and the extraction of the digital watermark has to be executed on many samples.

Figure 6:
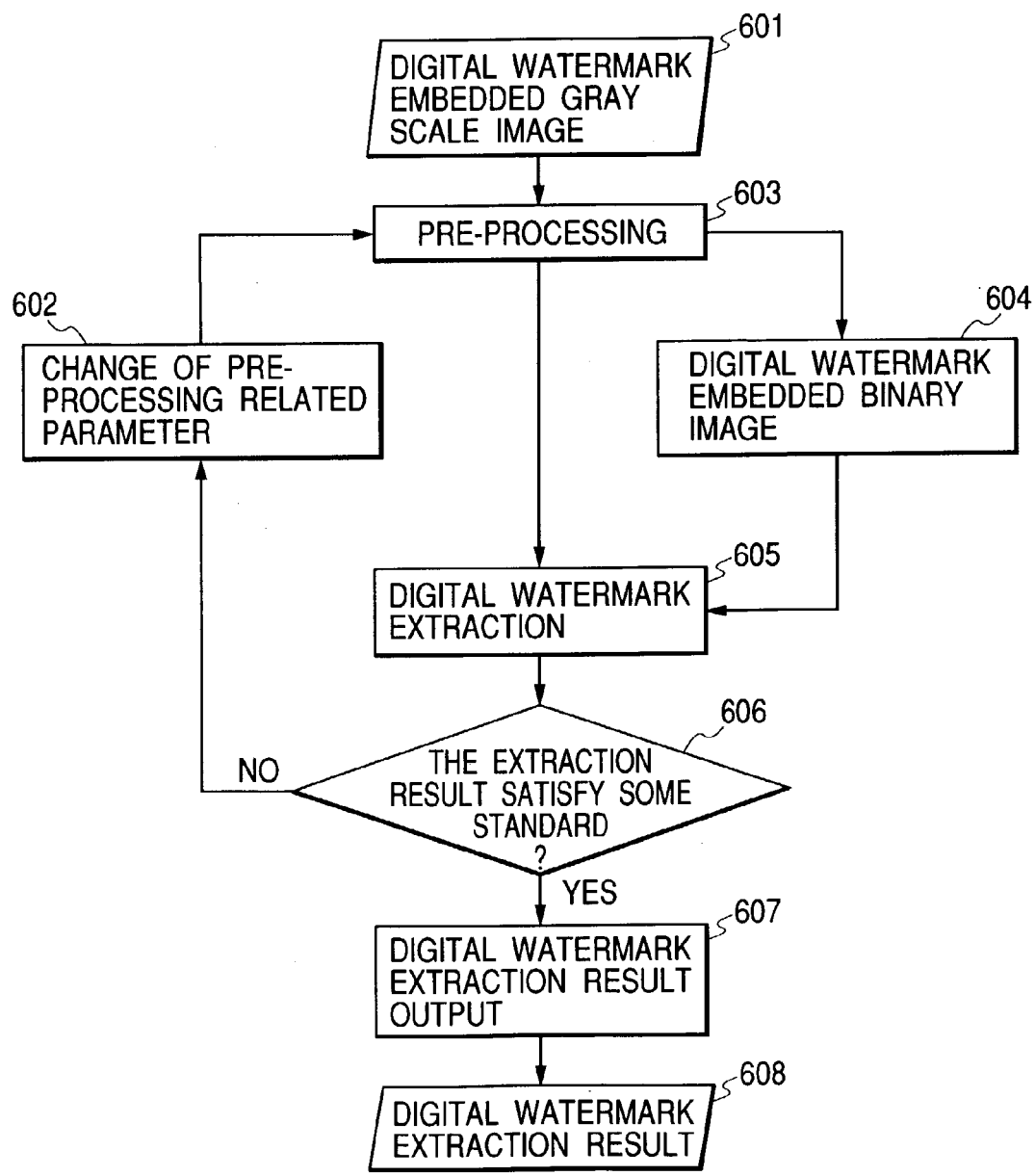
FIG. 6 is a flow chart showing a digital watermark extracting process (entire process) constituting a second embodiment.

FIG. 6 shows the outline of the process.

A numeral 601 indicates a multi-value image (gray scale image) which is subjected to embedding of digital watermark in a state of a binary image and then converted into a multi-value state, or a multi-value image (gray scale image) which is subjected to embedding of digital watermark in a state of a binary image, then printed, and generated by reading the printed image with a scanner (scanner 917 in FIG. 9). The gray scale image 601 is assumed to have 8 bits per pixel.

At first a pre-processing (603) is executed on the gray scale image (601) with the embedded digital watermark. The pre-processing is executed an arbitrary combination of the followings.

In the following there are shown pre-processings prior to the digital watermark extraction in the present embodiment and parameters involved in the result of each pre-processing:

i) binarizing of a gray scale image with a simple threshold value (related parameter: threshold value);

ii) binarizing by adaptively determining the threshold value with reference to the density distribution of a gray scale image (related parameter: value representing a deviation of the frequency distribution (for example corresponding to a skew statistical amount Sk in Japanese Patent Application Laid-open No. 08-223409));

iii) a combination of either binarization i or ii and at least one of following processes a–c:

a: a process of attaching a black pixel so as to be in contact with a boundary of a white pixel and a black pixel (related parameter: number of added black pixels);

b: a process of attaching a white pixel so as to be in contact with a boundary of a white pixel and a black pixel (related parameter: number of added white pixels);

c: elimination of an isolated point considered as a noise (related parameter: upper limit of magnitude of isolated point to be eliminated).

It is possible to improve precision of the digital watermark extraction to be explained later by preparing the aforementioned related parameter in plural number and selectively utilizing such plural parameters. Also the precision of extraction can be improved further by preparing the pre-processing in plural kinds.

The pre-processing is not limited to those described in the foregoing, but there may be employed any known process and parameters thereof as long as it is a process for converting a gray scale image into a binary image or a process of executing an image adjustment before or after such conversion.

In the following, the type of the pre-processing is not specified but will be explained as a pre-processing involving binarization.

As in the first embodiment, the processes of following steps can be controlled by the MPU 902 shown in FIG. 9. Also various programs, image data, parameters etc. are stored in the main storage apparatus 903.

A step 603 applies a pre-processing involving binarization on the gray scale image 601 based on various pre-processing parameters (initial values) to generate a binary image 604.

A next step 605, extracts the digital watermark from the binary image 604.

A step 606 discriminates whether the extraction result of the digital watermark satisfies a predetermined standard. In case the extraction result of the digital watermark satisfies the predetermined standard, a step 607 determines an output of the extraction result of the digital watermark and outputs such result as an extraction result 608 of the digital watermark. In case the extraction result of the digital watermark does not meet the predetermined standard, the sequence proceeds to a step 602.

A step 602, changes the finally applied pre-processing parameter to a next candidate pre-processing parameter, and the sequence returns to the step 603. The steps 603, 605, 606 and 602 are repeated until the discrimination criterion of the step 606 is met.

As one of the aforementioned standard, there can be applied an estimation result whether the digital watermark is correct or not. For example, as in the step 111 in the first embodiment, in case it is judged that "the digital watermark is correct" based on the result of parity check on the extracted digital watermark, such digital watermark is determined as the final output. On the other hand, in case it is judged that "the digital watermark is incorrect," there may be executed a setting of a next pre-processing parameter, a pre-processing and an extraction process of the digital watermark.

The apparatus explained in the foregoing embodiment is provided with an acquisition unit (corresponding to scanner 901; and acquisition of gray scale image 601) for acquiring multi-value image data representing an image in which the digital watermark is embedded in a state of a binary image and obtained by conversion into a multi-value state after such embedding, a pre-processing unit (corresponding to MPU 902; and step 603 etc.) for selecting one of plural binarizing threshold values and binarizing the multi-value image data with the selected threshold value, and an extracting unit (corresponding to MPU 902; step 605 etc.) for extracting the digital watermark from binary image data, obtained by binarization in the pre-processing unit, also is adapted to repeat plural times execution of binarization by selecting an unselected one from the plural threshold values and analysis of binary image data obtained by such binarization (corresponding to repetition of steps 602, 603, 605 and 606 until the standard of step 606 is satisfied), then to specify, from the plural analysis results obtained by such repetition (corresponding to the extraction results of plural times in the step 606), an analysis result satisfying a predetermined standard (corresponding to the single extraction result passing the parity check), and, based on the digital watermark extracted from the binary image data binarized with the threshold value corresponding to the specified analysis result (corresponding to the single extraction results passing the parity check), to specify a final digital watermark (corresponding also to the digital watermark passing the parity check), and is further provided with output means (corresponding to MPU 902; step 607) for outputting such digital watermark.

As explained in the foregoing, the present embodiment repeats the pre-processing and the digital watermark extraction by changing the parameter (for example binarizing threshold value) relating to the pre-processing, but terminates the process when the extraction result of the digital watermark satisfies a certain standard, whereby the digital watermark can be extracted efficiently with a high precision.

(Third Embodiment)

The foregoing first embodiment has explained a method of executing the pre-processing (including binarization) and the digital watermark extraction on all the pre-processing parameters.

Also the foregoing second embodiment has explained a method of selecting a single digital watermark passing the parity check as a final output.

However, other methods other than those in the foregoing embodiments can also be effectively utilized.

For example, the foregoing first and second embodiments may be combined in the following manner as a third embodiment.

The configuration of apparatus/steps is basically same as that in the first embodiment and will not be explained further.

The present embodiment is featured in that the discrimination standard in the step 105 of the first embodiment is replaced by following:

step 105: "whether the extraction results (1) passing the parity check are less than 5 and whether the threshold value is 255 or less?"

Thus, in case five or more extraction results pass the parity check, it is possible to dispense with the discrimination process such as the step 105 and to quickly move to the next step 111. Also a majority decision can be executed with the five digital watermarks passing the parity check, whereby the digital watermark can be extracted efficiently with a considerably high precision.

Also there is reduced a possibility of executing the pre-processing (including binarization) and the digital watermark extraction on all the pre-processing parameters, whereby the entire process time can also be reduced.

In the present embodiment, the objects of comparison in the step 105 need not necessarily be five but can be suitably selected according to the experience of those skilled in the art.

As in the first embodiment, the processes of following steps can be controlled by the MPU 902 shown in FIG. 9. Also various programs, image data, parameters etc. are stored in the main storage apparatus 903.

The apparatus explained in the foregoing embodiment is provided with an acquisition unit (corresponding to scanner 901; and step 102 etc.) for acquiring multi-value image data representing an image in which the digital watermark is embedded in a state of a binary image and obtained by conversion into a multi-value state after such embedding, a pre-processing unit (corresponding to MPU 902; and steps 103, 105, 106, 110 etc.) for selecting one of plural binarizing threshold values and binarizing the multi-value image data with the selected threshold value, and an extracting unit (corresponding to MPU 902; step 108 etc.) for extracting the digital watermark from binary image data, obtained by binarization in the pre-processing unit, also is adapted to repeat plural times execution of binarization by selecting an unselected one from the plural threshold values and analysis of binary image data obtained by such binarization (corresponding to extraction of the digital watermark using threshold values 0–255 in succession), then to specify, from the plural analysis results obtained by such repetition (corresponding to the extraction result (1) prior to parity check), analysis results satisfying a predetermined standard (corresponding to the five or less extraction results (1) passing the parity check), and, based on digital watermarks extracted from the binary image data binarized with the threshold value corresponding to the specified analysis result (corresponding to the five or less extraction results (1) passing the parity check), to specify a final digital watermark (corresponding to the digital watermark specified by majority decision of the five or less extraction results (1) passing the parity check), and is further provided with output means (corresponding to MPU 902; step 111) for outputting such digital watermark.

(Fourth Embodiment)

The present embodiment explained another example of determination of an optimum binarizing threshold value as in the foregoing first embodiment. In the present embodiment, however, the digital watermark extraction is not executed until the optimum parameter is obtained, and the optimum parameter is determined based on a certain evaluation standard.

As in the first embodiment, the processes of following steps can be controlled by the MPU 902 shown in FIG. 9. Also various programs, image data, parameters etc. are stored in the main storage apparatus 903.

Figure 7:
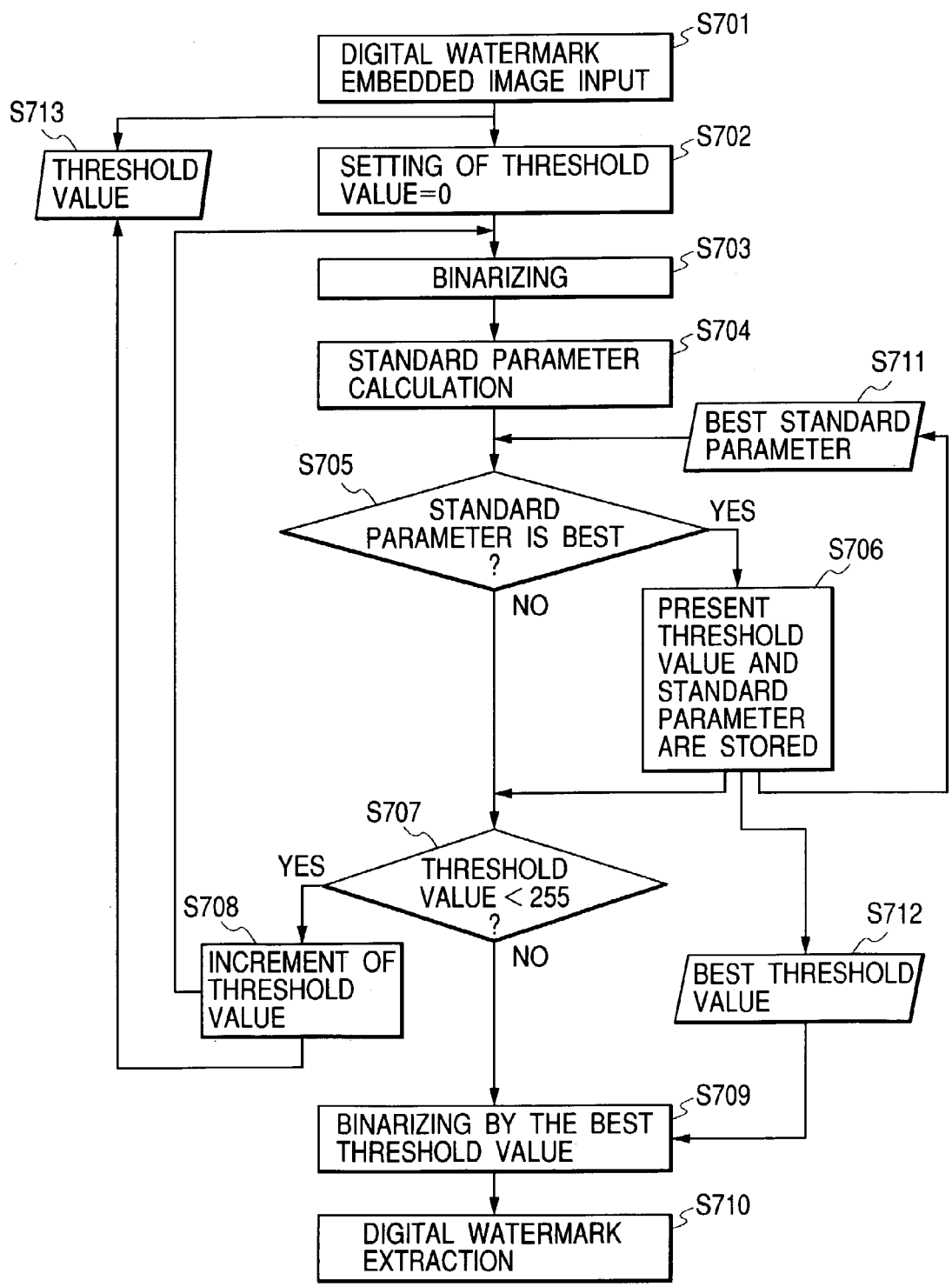
FIG. 7 is a flow chart showing a digital watermark extracting process (entire process) constituting a fourth embodiment.

Now reference is made to FIG. 7 for explaining the digital watermark extracting operation in the present embodiment.

In a step 701, an image which is subjected to embedding of digital watermark and is converted into a multi-value state in the same method as in the first embodiment is entered as a gray scale image. Referring to FIG. 9, this process corresponds to a reading of a document printed with the embedded digital watermark by the scanner 917 and storage of the obtained multi-value image data in the main storage apparatus 903 through the interface 915.

Then the binarizing threshold value is set at 0. In the present embodiment, discrimination is made for each of the threshold values 0 to 255, whether it is an optimum parameter based on a certain evaluation standard.

A step 703 binarizes the multi-value image with the currently set threshold value. Referring to FIG. 9, this step 703 binarizes the gray scale image in the main storage apparatus 903 under the control of the MPU 902, and stores the obtained binary image in another storage area different from the storage area in which the gray scale image is stored.

Then a next step 704 calculates an evaluation standard parameter corresponding to the currently set threshold value. This evaluation standard parameter is used for evaluating a possibility that the digital watermark is embedded with a digital watermark algorithm for text explained in the first embodiment.

Since this embodiment also executes extraction of the digital watermark for text as in the foregoing first to third embodiments, it is assumed that the area discrimination according to the type of the image, the detection of the text area and the detection of the circumscription rectangle on each character in the text area are executed immediately before the calculation of the evaluation standard parameter. In the following there will be explained details of the evaluation standard parameter.

<Evaluation Standard Parameter>

By assuming that the digital watermark embedding algorithm for text, explained in the first embodiment, is also applied in the present embodiment, a following evaluation is possible in a stage prior to the extraction of the digital watermark.

Figure 8:
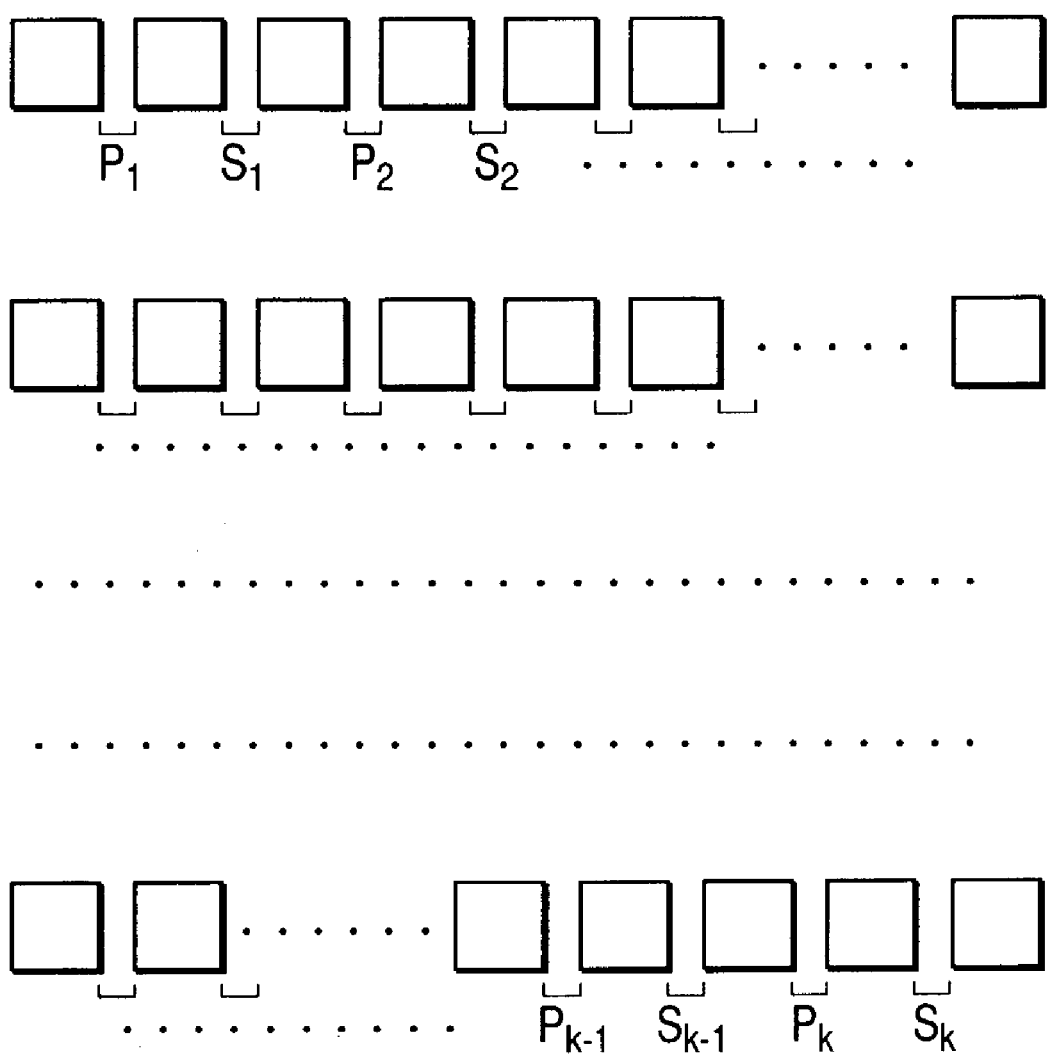
FIG. 8 is a view showing circumscription rectangles of characters and lengths of spaces therebetween.

In the text area in which the digital watermark is to be extracted, the space lengths between the characters (circumscription rectangles), defined by Pi', Si' (0<i≦k) become "P0', S0', P1', S1', . . . , Pi', Si', . . . , Pk', Sk'" as shown in FIG. 8.

Then Xk is defined for each Pi', Si' as follows:

$Xi = Pi/Si$ for $Pi > Si$ $Xi = Si/Pi$ for $Pi > Si$.

Then following C is taken as the evaluation standard parameter:

$$C = \frac{1}{k}\sum_{i=1}^{k}\left(Xi - \frac{1-\rho}{\rho}\right)^2$$

In case of employing the digital watermark embedding algorithm explained in the first embodiment (also employed in the present embodiment), the evaluation standard parameter C, calculated for a binary image in which the digital watermark is embedded, is generally smaller than the parameter calculated for a binary image in which the digital watermark is not embedded.

Therefore, a value of the evaluation standard parameter closer to 0 means that a binary image including an embedded digital watermark is processed and, stated differently, that the binarization is executed with a more preferred binarizing threshold value.

Then a step 705 checks whether the evaluation standard parameter C has an optimum value (hereinafter called a best standard parameter C) among the evaluation standard parameters C that have been calculated for the binary image. More specifically, there is checked whether it is closest to 0 among the evaluation standard parameters that have been calculated.

If the step 705 identifies that the newly calculated parameter C is the best standard parameter C, the sequence proceeds to a step 706.

A step 706 separately stores a currently referred threshold value 713 as "best threshold value 712 to be used again in a final binarization process (step 709)." Also the best standard parameter C 711 is renewed by the standard parameter C calculated in the step 705.

Then a step 707 discriminates whether the threshold value referred in the foregoing calculation of the evaluation standard parameter is smaller than 255. In case the threshold value 255 is smaller than 255, the sequence proceeds to a step 708, but, in case the threshold value reaches 255, the sequence proceeds to a step 709.

A step 708 executes an increment on the current threshold value, and takes the incremented threshold value as a new threshold value. Then the sequence returns to the step 703 to repeat the above-explained process.

A step 709 binarizes the original multi-value image (gray scale image) with the threshold value 712 finally determined by the aforementioned steps 705 and 706.

A step 710 extracts the digital watermark in a method similar to that in the first embodiment, from the binary image obtained in the aforementioned step 709. In the present embodiment, this is the first and last digital watermark extracting process.

The digital watermark embedding/extracting method explained in the foregoing is merely one of various digital watermark embedding/extracting methods, and the present invention includes a case of another digital watermark embedding/extracting method. Also the aforementioned evaluation standard parameter C depends on the embedding method, and the calculation formula for the evaluation standard parameter C has naturally to be varied when the embedding method is altered.

The apparatus explained in the foregoing embodiment is provided with an acquisition unit (corresponding to scanner 901; and step 701 etc.) for acquiring multi-value image data representing an image in which the digital watermark is embedded in a state of a binary image and obtained by conversion into a multi-value state after such embedding, a pre-processing unit (corresponding to MPU 902; and steps 702, 703, 707, 709, 709 etc.) for selecting one of plural binarizing threshold values and binarizing the multi-value image data with the selected threshold value, and an extracting unit (corresponding to MPU 902; step 710 etc. following step 709) for extracting the digital watermark from binary image data, obtained by binarization in the pre-processing unit, also is adapted to repeat plural times execution of binarization by selecting an unselected one from the plural threshold values and analysis of binary image data obtained by such binarization (corresponding to calculation of evaluation standard parameter using threshold values 0–255 in succession), then to specify, from the plural analysis results obtained by such repetition (corresponding to the plural evaluation standard parameters C), an analysis result satisfying a predetermined standard (corresponding to the evaluation standard parameter closest to 0), and, based on digital watermarks extracted from the binary image data binarized with the threshold value corresponding to the specified analysis result (corresponding to the digital watermark extracted from the binary image data binarized with a threshold value corresponding to the evaluation standard parameter closest to 0), to specify a final digital watermark (corresponding to the digital watermark extracted from the binary image data binarized with a threshold value corresponding to the evaluation standard parameter closest to 0), and is further provided with output means (corresponding to MPU 902; step 710) for outputting such digital watermark.

The present invention may be applied to a system consisting of plural equipment (for example host computer, interface devices, reader, printer etc.) or an apparatus consisting of a single equipment (such as a copying machine or a facsimile apparatus).

Also since the aforementioned processes can be realized by operating the entire apparatus under the control of the MPU 902 based on a predetermined program, the present invention includes also a program for controlling the aforementioned processes, and a storage medium which stores such program in a computer readable manner.

As explained in the foregoing, the embodiments allow to precisely extract the digital watermark from image data which are subjected to embedding of digital watermark in a state of binary image and then converted into a multi-value image (gray scale image). It is also possible to achieve extraction of the digital watermark in efficient manner.

Also in case the digital watermark is embedded by changing the distance of character images constituting a representative example of a binary image, it is possible to precisely extract such digital watermark from a multi-value image in which such digital watermark is embedded.

As explained in the foregoing, the present invention allows to precisely extract the digital watermark from image data which are subjected to embedding of digital watermark in a state of binary image and then converted into a multi-value image (gray scale image).

The present invention is subject to various modifications within the spirit and scope of the appended claims.

What is claimed is:

1. A digital watermark extracting method comprising:
   an acquiring step of acquiring multi-value image data which represent an image which has been subjected in a state of binary image to embedding of a digital watermark and are obtained by a conversion into a multi-value state after said embedding;
   a pre-processing step of selecting one of plural threshold values for binarization and binarizing said multi-value image data with the selected threshold value;
   an extracting step of extracting the digital watermark from binary image data binarized in said pre-processing step; and
   a parity check step of performing a parity check of the digital watermark extracted in said extracting step;
   a storing step of storing in a memory means a digital watermark which is judged not to include an error as a result of the parity check;
   a repetition step of selecting an unselected threshold value from among the plural threshold values, and repeating the processes of said pre-processing step, said extracting step, said parity check step and said storing step for the selected threshold value; and
   an output step of specifying and outputting a final digital watermark by performing majority decision of each bit position on a bit train constituted by each of the plural digital watermarks stored in the memory means.

2. A digital watermark extracting method according to claim 1, wherein said acquiring step acquires said multi-value image data by reading a printed matter by a scanner, and said printed matter is a print of the image in which the digital watermark is embedded in the state of binary image.

3. A digital watermark extracting method according to claim 1, wherein the selection of said threshold value is executed in succession on all the plural threshold values for binarizing.

4. A digital watermark extracting method according to claim 1, wherein said binarization is executed by adaptively determining the threshold value for binarizing by reffering to the density distribution of said multi-value image data.

5. A digital watermark extracting method according to claim 1, wherein, in combination with the binarizing in said pre-processing step, there is executed at least one of a process of eliminating an isolated point considered as a noise, a process of adding a black pixel so as to be in contact with a boundary of a white pixel so as to be in contact with a boundary of a white pixel and a black pixel.

6. A digital watermark extracting method according to claim 5, wherein, in said repetition step, a parameter relating to said processing executed in combination with the binarizing in each time is changed in succession.

7. A digital watermark extracting method according to claim 1, wherein the embedding of the digital watermark in said binary image state is executed by changing a space length between characters in said binary image according to a predetermined standard.

8. A digital watermark extracting apparatus comprising:
   an acquiring unit for acquiring multi-value image data which represent an image which has been subjected in a state of binary image to embedding of a digital watermark and are obtained by a conversion into a multi-value state after said embedding;
   a pre-processing unit for selecting one of plural threshold values for binarization and binarizing said multi-value image data with the selected threshold value; an extracting unit for extracting the digital watermark from binary image data binarized in said pre-processing unit; and
   a parity check unit for performing a parity check of the digital watermark extracted by said extracting unit;
   a storing unit for storing in a memory means a digital watermark which is judged not to include an error as a result of the parity check;
   a selecting unit for selecting an unselected threshold value from among the plural threshold values, and repeating the processes by said pre-processing unit, said extracting unit, said parity check unit and said storing unit for the selected threshold value; and
   an output unit for specifying and outputting a final digital watermark by performing majority decision of each bit position on a bit train constituted by each of the plural digital watermarks stored in the memory means.

9. A computer readable storage medium storing a digital watermark extracting program, the program comprising:
   an acquiring step of acquiring multi-value image data which represent an image which has been subjected in a state of binary image to embedding of a digital watermark and are obtained by a conversion into a multi-value state after said embedding;
   a pre-processing step of selecting one of plural threshold values for binarization and binarizing said multi-value image data with the selected threshold value;
   an extracting step of extracting the digital watermark from binary image data binarized in said pre-processing step; and
   a parity check step of performing a parity check of the digital watermark extracted in said extracting step;
   a storing step of storing in a memory means a digital watermark which is judged not to include an error as a result of the parity check;
   a repetition step of selecting an unselected threshold value from among the plural threshold values, and repeating the processes of said pre-processing step, said extracting step, said parity check step and said storing step for the selected threshold value; and
   an output step of specifying and outputting a final digital watermark by performing majority decision of each bit position on a bit train constituted by each of the plural digital watermarks stored in the memory means.

* * * * *

UNITED STATES PATENT AND TRADEMARK OFFICE
CERTIFICATE OF CORRECTION

PATENT NO. : 7,190,807 B2
APPLICATION NO. : 10/385852
DATED : March 13, 2007
INVENTOR(S) : Jun Tamaru et al.

It is certified that error appears in the above-identified patent and that said Letters Patent is hereby corrected as shown below:

Cover Pg. (56) References Cited, Other Publications,

"Conf r. on" should read --Confer. On--.

(57) Abstract, "binarization an" should read --binariation and--.

Drawing Sheet 5, "SATISFY" should read --SATISFIES--.

Col. 1, line 18, "to human." should read --to humans--.

line 34, "pp.419-422)" should read --pp. 419-422)--; and

"handing" should read --handling--.

line 37, "In case" should read --in a case wherein--.

line 51, "and is to" should read --and is intended to--.

line 57, "case" should read --a case wherein--.

line 62, "above-mentioned-object" should read --above-mentioned object--.

Col. 3, line 43, "pre-processings" should read --pre-processing--.

Col. 4, line 30, "method" should read --methods--.

line 31, "case" should read --a case--.

line 38, "following" should read --The following--.

line 66, "subjected" should read --subjected to--.

Col. 5, line 29, "In case" should read --In a case wherein--; and

"or less" should read --or less than--.

line 63, "following" should read --the following--.

UNITED STATES PATENT AND TRADEMARK OFFICE
CERTIFICATE OF CORRECTION

PATENT NO.       : 7,190,807 B2
APPLICATION NO.  : 10/385852
DATED            : March 13, 2007
INVENTOR(S)      : Jun Tamaru et al.

It is certified that error appears in the above-identified patent and that said Letters Patent is hereby corrected as shown below:

Col. 6, line 2, "applicable widely" should read --widely applicable--.

line 6, "case" should read --a case wherein--.

line 41, "The a step" should read --A step--.

line 61, "P0, S0, P11," should read --P0, S0, P1,--.

line 65, "P0', S0', Pi', S'," should read --P0', S0', P1', S1',--.

line 67, "example: (01101...1)" should read --example:¶ (01101...1)--.

Col. 7, line 5, "case" should read --a case wherein--.

line 7, "following" should read --the following--.

line 14, "case" should read --a case wherein--.

line 15, "following" should read --the following--.

line 17, "Pi'=(1-$\rho$) * (Pi +Si)/2" should read --Pi'=(1+$\rho$) * (Pi +Si)/2--.

Col. 8, line 14, "person" should read --person occurs--.

line 63, "case" should read --a case wherein--.

Col. 9, line 30, "case" should read --a case wherein--.

line 45, "executed" should read --executed in--.

line 46, "followings." should read --following.--.

Col. 10, line 19, "following" should read --the following--.

line 30, "case" should read --a case wherein--.

line 35, "case" should read --a case wherein--.

line 45, "case" should read --a case wherein--.

line 48, "case" should read --a case wherein--.

UNITED STATES PATENT AND TRADEMARK OFFICE
CERTIFICATE OF CORRECTION

PATENT NO. : 7,190,807 B2
APPLICATION NO. : 10/385852
DATED : March 13, 2007
INVENTOR(S) : Jun Tamaru et al.

It is certified that error appears in the above-identified patent and that said Letters Patent is hereby corrected as shown below:

Col. 11, line 42, "following:" should read --the following:--.

line 46, "case" should read --a case wherein--.

line 61, "following" should read --the following--.

Col. 12, line 38, "following" should read --the following--.

Col. 13, line 26, "following" should read --the following--.

line 34, "case" should read --a case--.

line 64, "case" should read --a case wherein--.

line 66, "case" should read --a case wherein--.

Col. 15, line 7, "case" should read --a case wherein--.

line 57, "reffering" should read --referring--.

line 64, "white pixel so as" should read --white pixel and a black pixel, and a process of adding a white pixel so as--.

Col. 16, line 18, "value; and" should read --value; ¶ an--.

Signed and Sealed this

Twelfth Day of August, 2008

JON W. DUDAS
*Director of the United States Patent and Trademark Office*